UNITED STATES PATENT OFFICE 2,455,358

MANUFACTURE OF SYNTHETIC MINERAL PRODUCTS

Wladimir Diterichs, Paris, France; vested in the Attorney General of the United States No Drawing. Application October 14, 1938, Serial No. 235,108. In Luxemburg October 30, 1937

5 Claims. (Cl. 106—39)

The present invention relates to the manufacture of synthetic mineral matters and agglomerates, and in particular articles of this kind of monoblock form.

An object of the present invention is to provide articles of this kind which can be utilised as abrasive products, refractory products, insulating or conducting products for heat and/or electricity.

Another object of the present invention is to provide binders for the obtaining of the synthetic matters above mentioned from substances such as abrasive materials, refractory materials, insulating or conducting substances for heat and/or electricity, cementation and molding materials, and so on.

A further object of the present invention is to provide a method of manufacturing the products above referred to.

Still another object of the present invention is to permit of manufacturing in a synthetic manner crystallized materials and crystallized mineralogic species such as they exist in nature, and this with the following advantages: Due to the fact that the process involves the passage of the products through a fluid or pasty state, it is easy to give the final objects shapes that could at most be obtained at the cost of a slow and expensive work from the known natural species when the latter are bodies of considerable hardness; when these species are rare or difficult to obtain, the method according to the present invention reduces the cost and difficulty of obtaining them. Of course in the case of synthetic products identical to natural products, the invention involves these products only insofar as they are artificially obtained through my method. My invention also permits of creating crystallized mineralogic species which, as far as I am aware, were unknown up to the present time and constitute, on the other hand, valuable industrial products.

Still another object of the present invention is to provide products which, within their field of utilization, differ from the known products, comparable from the point of view of their utilization, by a higher percentage of reactive elements. For instance, in the case of refractory products, the infusibility of the whole product may be higher than that of the agglomerated material. Also, the cohesion of the finished product may be higher, and, if account is taken thereof, the hardness is greater.

The essential feature of the binder according to the present invention is the following: It includes, on the one hand, a mineral colloidal jel, on the other hand one or several mineral compounds kept in balanced solution through the network of the jel and capable of reacting both with this jel and with one another, with the production of defined crystals. According to the best accepted theories of colloidal chemistry, such mineral colloidal gels are composed of an intermicellar liquid in which the mineral components are "dissolved"; and these components and the gel itself are adapted to react with each other to form the crystals of the character required. Furthermore, the constituents of the jel (that is to say the mineral components of the jel and the mineral component or components of the mineral bodies in solution) are chosen in such manner as to produce crystalline systems which are identical, isomorphous, or compatible (for instance by twinning or by zoning) together and, eventually, with the crystals of the matter to be agglomerated if the latter is of crystalline structure.

A particularly advantageous kind of binder of this kind is that in which the chief elements have atomic numbers close to one another and to those of the chief elements or of the elements of the matter to be agglomerated.

According to still another feature, which has been found to be important from an industrial point of view, the binder for the agglomeration of a given raw material (that is to say a binder the components of which are chosen accordingly, as above explained) has characteristics corresponding not only with the nature of the raw material to be agglomerated but also with its granulometric composition and its density, and this, in particular, with a view to permitting an adjustment, as perfect as possible, of the adhesive and adsorption power, without involving, on the other hand, any change in the physico-chemical properties of the final crystals. It will be readily understood that it is possible, in this way, to obtain the highest effectiveness from the binder, and, in particular, to use a minimum amount of said binder for the preparation of the final product, and also to reduce to a minimum the duration of the treatments from the addition of the binder to the obtainment of the final product. The characteristics of the binder which are referred to are chiefly the volume of the mineral colloidal jel, the density of the solution retained by the jel and the final density of the binder. It is impossible to give, concerning these characteristics, a rigorous general law, but any person skilled in the art will be able, in every case, to determine the best possible characteristics, account being taken of the fact that the adhesive power varies in direct proportion to the density of the binder, which must also vary in direct proportion to the mean size of the grains of the matter to be agglomerated, whereas the adsorption power varies in inverse ratio to the density of the binder and also to the mean size of the grains of matter to be agglomerated.

The preparation of the binders above defined from the constitutive elements, once the latter have been chosen with a view to the final product to be obtained, is effected as a rule through the known means and methods of the art. An example will illustrate the process to be employed in a particular case.

The method of manufacturing the final products from the binders and the matters to be agglomerated essentially comprises the intimate mixing of the binder and of the matter in question, the operation of giving the desired shape to the more or less fluid mass thus obtained, a drying at temperatures which, as a rule, average from 200 to 250° C., a baking at higher temperatures (above 1000° C.) with, possibly, periods for which the product that is being treated is maintained at the same temperature, for the obtainment of the phenomena specific to each kind of matter that is treated, and finally a cooling.

In order to carry out the method according to the present invention, it is particularly advantageous to employ materials for agglomeration chosen from one or several of the following groups, given merely by way of example:

1. Abrasive products, both natural and artificial, such as emery, corundum, silicon carbide, boron carbide, various carbides and nitrides, either alone or in the form of mixtures, flintstone, quartz, tripoli or rottenstone, and all abrasive compounds.

2. Natural or artificial alumina, simple or complex ores or oxides, such as bauxite, magnesite, chromite, zirconia, iron and chromium oxides; oxides of the elements of the rare group, glucinum, molybdenum, tungsten, titanium, vanadium, thorium.

3. Silica and natural or artificial silicates.

The invention has, among other advantages, that of permitting the utilization of such matters in proportions as high, for instance, as 85 to 98.8%.

For the constitution of the binders according to the present invention, I may make use, in particular, of bodies chosen, according to the nature, the granulometric composition, and, eventually the crystalline composition of the matter or matters to be agglomerated, in the following groups hereinafter cited merely by way of example:

1. Halogenous acids, such as hydrochloric and hydrofluoric acids;

2. Oxygenated acids, such as phosphoric, boric, silicic, carbonic, chromic, molybdic, tungstic, vanadic, titanic acids;

3. Salts of sodium, potassium, lithium, calcium, barium, glucinum, magnesium, aluminium, iron, chromium, zinc, tin, lead, and all metallic salts of the halogenous or oxygenated acids of the type of those mentioned under 1;

4. Natural or artificial oxides, either anhydrous or hydrated, of potassium, sodium, lithium, calcium, barium, glucinum, magnesium, aluminium, iron, chromium, zinc, zirconium; oxides of rare earths.

It is further possible to make use of matters capable of producing or maintaining, in the course of the thermal treatment, and more especially of the baking, a reducing, or on the contrary oxidizing atmosphere. As examples of matters of this kind, I will cite coke, graphite, coal in various states, mineral or vegetable oils, cellulose and its derivatives, oxides and salts of chromium and iron.

Finally, I may, if necessary, make use of secondary materials and fillers, for instance of dolomite, "chamotte," quartzite, apatite, infusorial earth, clays, kaolins, micas, feldspars, and so on, the additional bodies in question being, for instance, introduced at the rate of a few percents.

In order better to explain the method according to the present invention for preparing the binders and the final products, I will hereinafter describe the various steps of the manufacture of a specific body, these indications having, of course, no limitative character.

I will consider the case in which it is desired to agglomerate a raw material consisting chiefly of rhombohedral alumina, and choice is made, for the constitution of the binder, of elements capable of supplying, after reaction and final crystallization, rhombohedral magnesian tourmaline having the following composition:

| | |
|---|---|
| $SiO_2$ | 48.5 |
| $Al_2O_3$ | 30.8 |
| $MgO$ | 12.0 |
| $B_2O_3$ | 6.9 |
| $Na_2O$ | 1.8 |

These components are supplied in the form of the various products in commercial use. For instance, alumina is in the form of hydrate in an equimolecular phosphoric solution; magnesia is in the form of chloride of magnesium with 6 molecules of water; boron is in the form of crude boric acid; the latter, decomposed by the acidity of the medium, will add its silica freed from the crude boric acid to the main silica introduced in the form of silica jel. In other words, for preparing 100 gr. of binder, I take the following elements:

| | G. |
|---|---|
| A. Magnesium chloride of 30° Bé | 26.2 |
| B. Hydrate of alumina | 13.3 |
| Phosphoric acid of 60° Bé | 28.1 |
| C. Sodium silicate of 43° Bé | 3.1 |
| Water (for dilution of the silicate) | 6.2 |
| D. Silica jel with 40% water (D=1.60) | 21.1 |
| E. Boric anhydride | 2.0 |
| | 100.0 |

I heat to 70° C., on the one hand, the magnesian solution to which there is added the boric anhydride, most of which will dissolve. During the cooling period, when the mass is at a temperature of about 50°, the silica jel is introduced. Then, I dissolve, in a steam bath, until lactescent formation of metaphosphate occurs, the hydrate of alumina in phosphoric acid and I add the product thus obtained to the composition previously obtained. When the suspension is finished, I pour the small amount of silicate therein, while stirring moderately. The mixture is left alone for a period of at least seven days. The density of such a mixture is 1.51. It gives, after baking, a proportion of crystalline binder of 28.3% by weight. For one kilogramme of raw material to be agglomerated, I will therefore chose a weight of the mixture corresponding to the desired percentage of baked binders; for instance 70.6 gr., represent 20 gr. of crystals.

When the mixture is made, it is important to take care that the value of the ratio of the molecular weights of the components which characterize the mineralogic species that are considered is correct. In the present instance, these molecular weights are those of $SiO_2$, $Al_2O_3$, $MgO$, $B_2O_3$ and $Na_2O$ and they must correspond to the respective proportions in rhombohedral magnesian tourmaline.

In the mixture above defined, the volume of the colloidal jel, the density of the solutions retained by said jel and the density of this mixture have been chosen in such manner that the viscosity of said mixture, the power of adhesion to the grains of alumina to be agglomerated, and the power of adsorption of the reagents and of water are optima, account being taken of the granulometric composition of alumina (in the present case, corundum containing 99.5% of alumina of 80 Standard wires fineness, 85%; corundum containing 99.5% of alumina, of 100 Standard wires fineness, 15%) and of the physico-chemical evolution of the medium.

The mixture is made homogeneous, preferably in a colloid mill, and it is malaxated with alumina and also with 1 or 2 per cent of coke powder in a mixer of suitable type. I add a small amount of water, i. e. from 0.5 to 1 per cent. I mold under a high pressure, the best results being obtained for values approximating 600 kgs. per sq. cm. (as a matter of fact, the shaping of the mass may include several known operations, such as pressing, wiredrawing, pouring, etc.). The molded pieces are then carried to the dryer, where they are subjected to temperatures up to about 260° C. for periods of time ranging from 12 to 48 hours according to the size of the piece. The hardened pieces are taken from the dryer and baked for periods of time ranging from 2 to 7 days, according to the volume of the piece. They remain for a period of time from 6 to 18 hours at 1260°, are brought to a temperature of 1370° in 6 to 18 hours and kept at this temperature for 6 to 10 hours, after which they are allowed to cool and removed from the oven.

Although the process must not be considered as limited to details of operation resulting from the application of the complex reactions involved in the course of the treatment, it is advantageous to take into account the following remarks which will help in understanding the sequence of reactions taking place in the chosen example:

When incorporating the matter to be agglomerated to the binder and giving the shape to the mass, the crushing of the mass produces a reaction due to the breaking of the jel which releases the electrolytes which up to then were immobilized. When the drying operation takes place, the jel concentrates. As soon as the temperatures become lower than 100° C., a hydrolysis is started with the disengagement of acid gas and steam, which produces the phenomenon of solidification of the binder. This hydrolysis is exothermic, but it must be started by an external heat. From 100 to 260°, the water interposed between the cells is given off, which produces the final destruction of the jel. The double decomposition reactions begin to occur. From 260 to 600°, in the course of the baking, dehydration is completed and dry melting begins. The chlorides, borates, phosphates produce the formation of the first crystalline germs. Free silica passes at 570° into the state of trydimite. From 600 to 1000°, the double decomposition reactions take place, the chlorides are decomposed, and the mineralizing reactions begin to take place. At the same time, as a consequence of the disengagement of volatile elements, which disengagement takes place until the end of the heating, the melted bath is supersaturated. From 1000 to 1400°, reactions of dissolution, of molecular transformations of deposits by igneous supersaturation develop, with the production of the crystalline mineral species intended to be obtained when the composition of the binder was chosen. The reducing bodies begin to act.

In a general manner, the form of the baking curve, the height of the temperature, the time for which the products remain heated at various temperatures depend upon the minerals to be obtained, the melting temperature of the eutectics and the viscosity of the vitreous and dissolving bath.

The last step of the transformations precedingly described is that of the cooling, that is to say of the petrifaction, of the mass. The equilibrium of the melted bath, containing the crystals which have been produced by double decompositions or supersaturations, is unstable. The bath remains in the liquid or vitreous state only owing to an excess of silica resulting from the primitive jel. During the cooling, the mass contracts, same as, during the dehydration at the beginning, the jel had contracted. The excess of silica, alumina, etc., is driven out of solution. This is the reason why the cooled binder often shows, in thin lamellae, a porphyritic or trachytic structure.

Of course, the above explanations and details have been given merely by way of example, and it should be well understood that, while I have, in the above description, disclosed what I deem to be an interesting embodiment of the present invention, I do not wish to be limited thereto as there might be changes made therein without departing from the principle of the present invention as comprehended within the scope of the appended claims.

The necessary qualifications of the crystallizing properties of the ingredients of the binder and of the final agglomerated product have been set forth very definitely but some difficulty arises in generically defining these qualifications by a single term. Therefore, in certain of the claims, when it is stated that the crystals of the materials used belong to crystalline systems which do not interfere with each other, it is meant that the crystals are identical, isomorphous, or compatible (as by twinning or zoning).

What I claim is:

1. The method of making an agglomerate of a material consisting chiefly of rhombohedral alumina which comprises forming a binder by reacting a mixture the constituent ingredients of which are about 26 parts of 30° Bé. solution of magnesium chloride, about 13 parts of alumina hydrate, about 28 parts of 60° Bé. phosphoric acid, about 3 parts of 43° Bé. sodium silicate, about 6 parts water, about 21 parts of silica jel with 40% water and about 2 parts of boric anhydride, mixing said binder intimately and in a homogeneous manner with the material to be agglomerated, giving the mass thus obtained the desired shape, drying at a temperature below 300° C., then heating at a temperature above 600° C. and finally cooling.

2. A method according to claim 1 in which the proportion of material to be agglomerated is as high as 99%.

3. A method according to claim 1 in which materials are added to the mass which are capable of producing a reducing atmosphere during the heat treatment.

4. The method of preparing a binder for agglomerating a material consisting chiefly of rhombohedral alumina, which comprises reacting a mixture the constituents of which are about 26 parts of 30° Bé. solution of magnesium chloride, about 13 parts of alumina hydrate, about 28 parts of 60° Bé. phosphoric acid, about 3 parts of 43° Bé. sodium silicate, about 6 parts water, about 21 parts of silica jel with 40% water and about 2 parts of boric anhydride.

5. The binder prepared by the method of claim 4.

WLADIMIR DITERICHS.

REFERENCES CITED

The following references are of record in the file of this patent:

UNITED STATES PATENTS

| Number | Name | Date |
|---|---|---|
| 1,049,005 | Steinmetz | Dec. 31, 1912 |
| 1,760,360 | Hood | May 27, 1930 |
| 2,066,543 | Seil | Jan. 5, 1937 |

OTHER REFERENCES

Ford, Dana's Manual of Mineralogy, 13th ed. (1915), pages 262 to 264.